June 2, 1970 J. R. ZURBRICK ET AL 3,515,987
COPLANAR DIELECTRIC PROBE HAVING MEANS FOR MINIMIZING
CAPACITANCE FROM STRAY SOURCES
Filed Oct. 20, 1967

INVENTORS.
JOHN R. ZURBRICK
BY ROBERT S. MENCHEL

Charles M. Hogan
Gary M. Gron
ATTORNEYS.

United States Patent Office 3,515,987
Patented June 2, 1970

3,515,987
COPLANAR DIELECTRIC PROBE HAVING MEANS FOR MINIMIZING CAPACITANCE FROM STRAY SOURCES
John R. Zurbrick, Nashua, N.H., and Robert S. Menchel, Penfield, N.Y., assignors to Avco Corporation, Wilmington, Mass., a corporation of Delaware
Filed Oct. 20, 1967, Ser. No. 676,843
Int. Cl. H01g 7/00
U.S. Cl. 324—61                                    5 Claims

ABSTRACT OF THE DISCLOSURE

The disclosure illustrates a dielectric probe for determining material properties by measuring the material effect on an electrostatic fringe field from a pair of coplanar plate elements. The plate elements are formed on one side of a printed circuit board to provide a gap with a specific geometric pattern. A series of electrically conductive portions of the printed circuit between and surrounding the plates and on the opposite side of the board are maintained at ground potential so that the capacitance between the probe plate elements is substantially only that of the fringe field on one side of the printed circuit board. The printed circuit board is mounted on a rigid base to prevent physical deformation and change in capacitance value. The plates are connected via separate shielded cables to a remote indicating instrument.

---

The present invention relates to dielectric probes and more specifically to dielectric probes for use in testing of materials.

For some time it has been a common practice to determine material properties by sensing the effect of a material on an electrostatic field in which it is placed. An example of this use is that of moisture content measurement for fiberglass reinforced plastic electrical insulating material. The dielectric constant of the water is different than that of the fiberglass material and the amount of moisture may be readily determined by comparing the dielectric constant of a sample to a moisture-free or other reference sample.

In the past, probe designs for this use consisted of a pair of parallel plates spaced from one another to form a gap in which the material to be tested was placed. This approach had the obvious disadvantage of requiring a fixed size sample and the disadvantage of the inability to test material when only one side of the material is free for access. To eliminate this problem a coplanar probe has been used. Generally, this probe comprises a pair of plate elements in the same plane and spaced from one another so that an electrostatic fringe field generated between the two plate elements extends primarily out of the plane in which the plate elements are positioned. This fringe field may be used to provide a one-sided determination of material properties. While providing greater flexibility in the use of capacitance measurements for determining material properties, this type of probe has an inability to sense relatively small differences in dielectric constant. This is because the electrostatic fringe field emanates in all directions from the plate elements and capacitance from stray sources, such as the operator's hands, position of the probe relative to an indicating device, etc., would affect the reading and sometimes mask the true differences sought to be detected.

Accordingly, it is a prime object of the present invention to provide a highly accurate coplanar dielectric probe for determining material properties, which has a high degree of stability and is relatively unaffected by the surrounding environment other than the material to be tested.

It is a further object of the present invention to provide a reliable, economical and easily produced dielectric probe.

The above ends are achieved in the broader aspects of the present invention by providing a dielectric probe for determining material properties. The probe comprises first and second plate elements separated from one another in the same plane. Means are positioned in the same plane with the plate elements for providing a conductive ground potential surface between and surrounding the plate elements so that an electrostatic fringe field extends from the plane in which the plates are positioned. Means are provided for defining a conductive plane at ground potential closely spaced from and on one side of the plane in which the plate elements are disposed. The conductive ground plane extends in area at least as far as the outer periphery of the first and second plate elements. Means are provided for maintaining the dielectric constant in the space between the plate element and the ground potential plane substantially constant. Therefore, the capacitance across the plate elements is substantially dependent upon material positioned in the fringe field extending from the opposite side of the capacitance elements.

The above and other related objects and features of the present invention will be apparent from a reading of the description of the disclosure found in the accompanying drawing and the novelty thereof pointed out in the appended claims.

Figure 1:
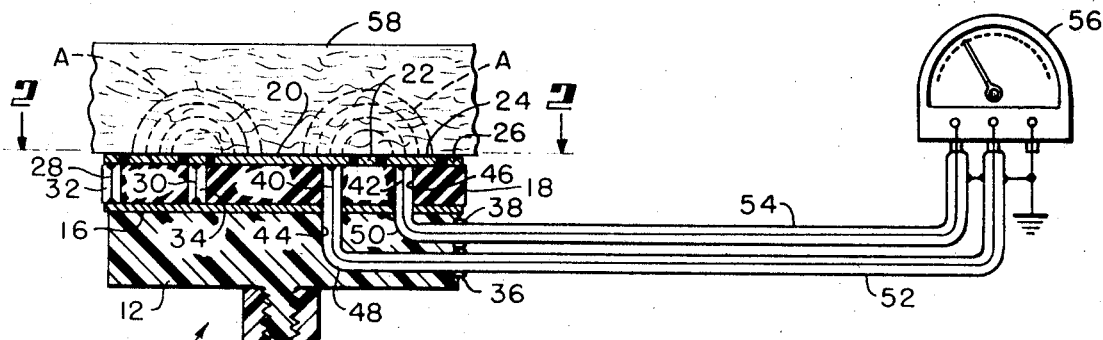
FIG. 1 is a highly simplified longitudinal view of a dielectric probe embodying the present invention, connected to an appropriate indicating instrument.

Reference is had to FIG. 1 which shows in simplified fashion a dielectric probe 10 embodying the present invention. The dielectric probe 10 comprises a relatively massive and rigid base plate 12 and an operator handle 14 secured thereto. The base plate 12 and the handle 14 may be conveniently fabricated from insulating material. Positioned on the circular base plate 12 is a relatively thin circular conductive sheet 16. A relatively thin circular plate of dielectric material having a relatively stable dielectric constant is positioned on the opposite side of the conductive plate 16. Secured to the upper face of the dielectric material 18 is a circular conductive sheet 20, as particularly illustrated in FIG. 2, which forms one of the coplanar plate elements for the dielectric probe. A concentric intermediate ring of conductive material 22 having a relatively thin width surrounds and is spaced from the inner plate element 20. A concentric conductive ring 24 which forms the second coplanar plate element is positioned around the intermediate ring 22 and insulated therefrom. A concentric ring 26 of conductive material surrounds the outer periphery of the plate element 24 and is insulated therefrom.

As particularly evident in FIG. 1, the intermediate ring 22 and the outer ring 26 are electrically connected to the circular plate 16 by wires 28 and 30, respectively. The wires 28 and 30, respectively, extend through passageways 32 and 34 which are formed in the dielectric material 18. The inner plate element 20 and the outer plate element 24 are electrically connected to output connectors 36 and 38 by wires 40 and 42, respectively. The wires 40 and 42 extend through passageways 44 and 46 formed through the dielectric material 18, the circular conductive plates 16 and the base plate 12. The wires 40 and 42 are insulated from the conductive plate 16 by a coaxial insulation and outer conductive shields 48 and 50. The shields 48 and 50 for the wires are electrically connected to the ground plane 16 and extend to the connectors 38 and 36. Suitable shielded cables 52 and 54 connect the leads 40, 42 to a capacitance indicating instrument, shown diagrammatically by reference character 56. The shielding from the cables 52, 54 is connected to a suitable ground reference connection on the instrument.

The dielectric probe 10 is adapted to be placed against a suitable test specimen 58, for example, an insulating type material. In operation, the indicating instrument 56 is adapted to generate an alternating voltage to one of the leads 40 or 42. Assuming the voltage is applied to lead line 40, an electrostatic field emanates from the plate 20 to the corresponding plate element 24, the sheet elements 22, 26 and the ground plate 16.

The electrostatic field between the plate element and the ground plate 16 remains substantially constant because the dielectric constant of the material 18 is relatively stable and the plate 16 is at a fixed reference. The electrostatic field emanating from a plate to the ground potential rings 22 and 26 is stable because the rings 22 and 26 are maintained at ground potential and the edges of the elements are extremely thin, which minimizes any parallel plate field.

As a result, the remaining electrostatic field projects away from the test face of the probe 10 and through the test specimen 58 as indicated by dotted lines A. This is an electrostatic fringe field which causes a voltage to be generated on the plate 24. This voltage is sensed by the instrument 56. Variations in the material properties which relate to the capacitance of the specimen 58 are reflected in the relation of the sensed voltage to the generating voltage.

It is apparent that all the electrostatic fields emanating from the plate element 20, other than those projected through the material 58, remain essentially constant. The ground potential rings 22 and 26 limit the extent of the field in the plane of the plate elements. The plate 18 has a very stable dielectric constant and the circular ground potential plane 16 to which the field projects is closely spaced to the plate elements to minimize the effect of any stray electrostatic fields on the reading. The rigid base 12 insures a constant position relationship between the conducitve portions of the probe to eliminate that effect on the capacitance reading.

As a result of confining all electrostatic fields to a closely spaced ground reference, the only factor affecting the capacitance reading is the material properties of the test specimen. Variables such as surrounding environment, e.g., the operators hands, humidity, do not affect the reading. This enables minute differences in material properties to be accurately sensed.

To further insure the accuracy of the probe 10, the leads 40 and 42 are contained in separate shielded cables thereby eliminating any possible capacitance relationship between the two wires. This enables relatively long leads 54 and 52 to be used without affecting the accuracy of the probe 10.

The probe 10, as shown, is highly accurate and adaptable for use with standard capacitance meters. For example, the probe has particular usefulness when connected to a Ballantine direct-reading capacitance meter, Model 520, manufactured by Ballantine Laboratories, Inc., P.O. Box 97, Boonton, N.J. 07005. Briefly, this meter provides an output indication which is a composite of the dielectric constant and the dissipation factor of the material. In cases where it is desirable to provide a separate indication of the dielectric constant and the dissipation factor, as in the determination of material properties for insulating material, the General Radio automatic capacitance bridge assembly type 1680–A, manufactured by the General Radio Company, 22 Baker St., West Concord, Mass., is particularly suitable.

Figure 2:
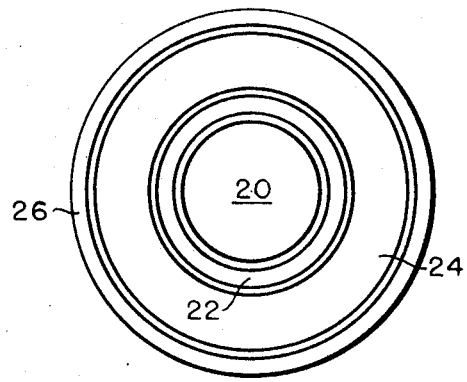
FIG. 2 is a view taken on lines 2—2 of FIG. 1, showing the test face of the dielectric probe.

It has been found that the electrostatic fringe field emanating from one plate element to the other has a direction that is generally normal to the gap between the two elements. The strength of the field generally depends upon the relative geometry of the plates but the direction of the field depends primarily on the geometrical relationship of the gap. For example, the fringe field emanating from the probe 10 with a plate configuration, as shown in FIG. 2, has a series of lines generated about the circumference of the probe. It is apparent that these lines tend to have the same relation to the material tesed wheher or not the probe head is rotated in relation to the material.

Figure 5:
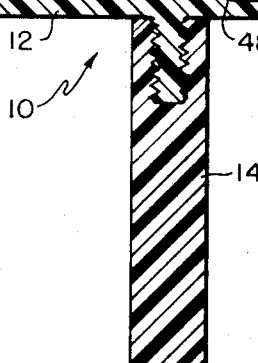
FIG. 5 is an enlarged fragmentary view taken on lines 5—5 of the probe shown in FIG. 3, which particularly illustrates the separation between the conductive elements of the probe.
Figure 3:
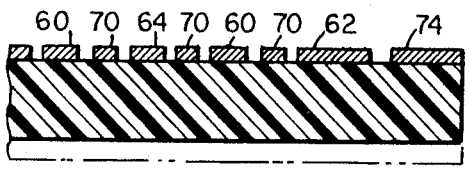
FIG. 3 is a view of a dielectric probe embodying the present invention, which shows an alternate probe face configuration.
Figure 3:
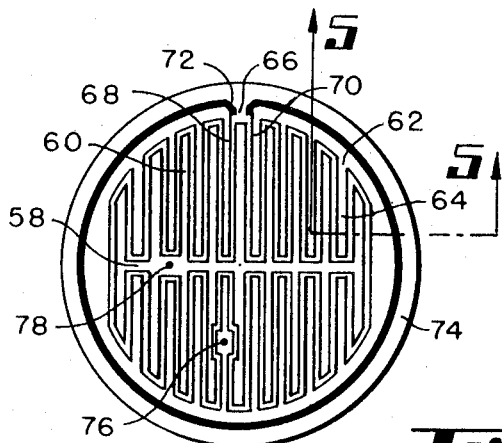

However, it has been found that if the gap between the plates has a geometrical shape so that it is generally longitudinal and in a given direction, the fringe field emanating between the two probes is oriented in a direction normal to the gap between the two. This polarizes the instrument and enables rotation of the probe head to determine variation in material properties in given directions. An example of a polarized shape is illustrated in FIG. 3 which shows a modified probe face. The first plate element comprises an electrically conductive longitudinal center strip 58 which has extending therefrom a plurality of longitudinal branch portions 60. The branch portions 60 extend in a direction normal to the axis of the center portion 58 and are symmetrical about its axis. The second plate element comprises an electrically conductive outer ring 62 which has a plurality of generally longitudinal branch portions 64 which extend into the spaces between adjacent branch portions 60 of the center portion 58 to form a gap which has a plurality of parallel portions extending in a given direction. An electrically conductive intermediate strip 66 extends through the gap separating the interfitting branch portions 60, 64 and conforms to the gap so that a given distance separates the intermediate portion from adjacent plate elements. The intermediate plate element 66 has two branches 68 and 70 which travel a circuitous path through the gaps between the plates and to an electrically conductive outer ring 74. FIG. 5 illustrates the gaps between the branch 70 of the intermediate plate element 66 and the branch portions 60, 64 of the plate elements 58 and 62, respectively. The plate elements 58, 62, intermediate plate element 6 and the outer ring 74 are formed from electrically conductive sheet-like material mounted on a base of dielectric material in a fashion similar to that for the probe 10 of FIG. 1. As previously stated, the outer ring and the intermediate strip are connected to the circular plate element on the opposite side (shown in phantom), which is in turn connected to ground reference source. An expanded portion 76 on one leg of the second plate element provides a connecting surface and an expanded portion 78 on the center portion 58 of the first plate element 60 forms a connecting surface. It is apparent from FIG. 3 that the gap formed between the plate elements has a substantial portion thereof which extends parallel in a given direction. This causes the electrostatic fringe field to be emanated from one plate to the other in a direction substantially normal to the longitudinal branch portions of the plates. Because the field produced thereby is directional in nature, it may be used with advantage to determine variation in material properties in different directions in the material.

Figure 4:
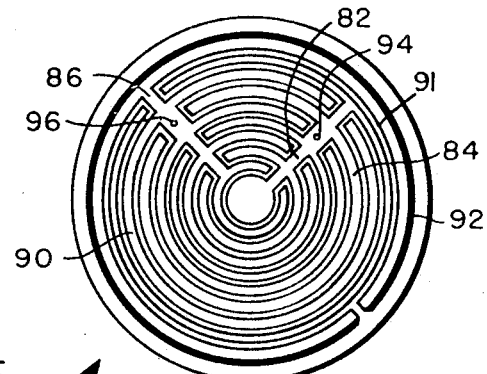
FIG. 4 is a view of another dielectric probe embodying the present invention and showing another probe face configuration.

Another configuration of an unpolarized probe head is illustrated in FIG. 4. In this configuration a first plate element comprises a generally radially extending center portion 82 which has extending therefrom a plurality of concentric semicircular branch portions 84. The branch portions 84 terminate on either side of a generally radially extending center portion 86 of a second plate element. The second plate element 86 also has a plurality of concentric semicircular branch portions 90 which extend in between adjacent semicircular branch portions 84 of the first plate element. Thus a gap is formed between the plate element which has a plurality of generally circular concentric portions. This causes the fringe field emanated between the plate elements to be substantially nonpolarized. An intermediate ground potential strip 91 extends through the gap between the plate elements and connects with a conductive outer ring 92 which is at ground potential. Expanded portions 94, 96, respectively, on the first and second plate elements form connecting surfaces. The ring 92 and intermediate strip are connected to a closely spaced ground potential plate. It is pointed out that the outer ring 92, intermediate ground potential strip 91 and the plate elements are formed from electrically conductive sheet-like material. These elements are spaced apart and mounted on a base of dielectric material to form the gaps described above.

It should also be noted that the probe face configuration, shown in FIGS. 3 and 4, has a relatively small gap between the plate elements and has a relatively large effective length for the gap. The substantial length resulting from these configurations enables a relatively small depth of field for the fringe field and enables that field to exhibit a great deal of strength. This provides a further control of the field and enables a substantial improvement in accuracy for determining relatively small differences and capacitances.

It is evident that the capacitance plate elements described may be extremely complex. Furthermore, it is necessary that the plate elements be accurately shaped and to provide reproducible capacitance response for probes of like design. These probe designs can be easily and accurately fabricated by using a printed circuit board. A printed circuit board may be plated with conductive material on both sides. Photo-etching techniques are then used to define the electrically conductive portions on the circuit. This printed circuit fabrication technique enables mass production of probes from a single master pattern.

Having thus described the invention what is claimed to be novel and desired to be secured by Letters Patent of the United States is:

1. A dielectric probe for determining material properties, said probe comprising:
   first and second electrically conductive plate elements formed from relatively thin sheet material and separated from one another in the same plane on one side of a printed circuit board, one of said elements being adapted to receive an electrical signal and the other being adapted to produce an electrical signal in response to the electrostatic field therebetween,
   means positioned in the same plane with said plate elements for providing a conductive ground potential surface between and surrounding the plate elements, comprising electrically conductive portions on the same side of said printed circuit board and insulated from said plate elements whereby electrostatic fringe fields extend from the plane in which the plates are positioned,
   an electrically conductive sheet at ground potential on a second side of the printed circuit board on which the plate elements are disposed, said conductive sheet extending in area at least as far as the outer periphery of the electrically conductive portions on the first side of said printed circuit board which provide a ground potential surface surrounding the first and second plate elements, and
   means for maintaining the dielectric constant in the space between the plate elements and the ground potential sheet substantially constant comprising a dielectric sheet material forming a base for the electrically conductive portions of said printed circuit board, and means for rigidly mounting said printed circuit board in a fixed plane irrespective of exterior stresses,
   whereby the parallel plate field between the plate elements is minimized, if not eliminated, and the capacitance across the plate elements is substantially dependent upon material positioned in the fringe field extending from the first side of the capacitance elements.

2. A dielectric probe as in claim 1 wherein:
   said first and second plate elements include longitudinally extending portions interfitting with one another to form a gap having a plurality of longitudinal portions extending parallel in a given direction, whereby substantially all of the electrostatic fringe field extends in a direction normal to the longitudinally extending edges of said plate element,
   said means for providing a conductive ground potential surface comprises generally longitudinal plate elements having a relatively small width extending in the gap between said capacitance plate elements,
   said means for providing a conductive ground potential surface surrounding said capacitance plate elements comprises an outer band extending around the periphery of said capacitance elements,
   whereby said dielectric probe is polarized for determining directional changes in material properties.

3. A dielectric probe as in claim 1 wherein:
   said first plate element comprises a longitudinally extending center portion having a plurality of longitudinal branch portions extending in a direction normal to the axis of the center portion and symmetrical about its axis,
   said second plate element comprises a generally circular outer band surrounding said first plate element and having a plurality of longitudinal branch portions extending into the space between adjacent branch portions of said first plate element,
   said means for providing a conductive ground potential surface comprises an intermediate generally longitudinal plate element extending through and conforming to the gap formed by the interfitting branch portions of said first and second plate elements, and
   said means for providing a conductive ground potential surrounding said plate elements comprises an outer generally circular band surrounding said second plate element and electrically connected to said intermediate plate.

4. A dielectric probe as in claim 1 wherein:
   said first and second plate elements include generally longitudinally extending portions interfitting with one another to form a gap having a plurality of circular concentric portions,
   said means for providing a conductive ground potential surface comprises a generally longitudinal plate element having a relatively thin width extending in the gap between said plate elements, and
   said means for providing a conductive ground potential surface surrounding said plate elements comprises an outer band extending around the periphery thereof, whereby said dielectric probe is unpolarized.

5. A dielectric probe as in claim 4 wherein:
   said first plate element comprises a radially extending center portion having generally longitudinal semicircular branch portions extending therefrom,
   said second plate element comprises a radially extending center portion having a plurality of generally longitudinal semicircular branch portions interfitting with said branch portions of the first proble element to form a plurality of circular gaps,
   said means for providing a conductive ground potential surface comprises an intermediate generally longitudinal plate element extending through and conforming to the gap formed by said first and second plate elements, and said means for providing a conductive ground potential surface surrounding said plate elements comprises a circular outer band surrounding said plate elements and electrically connected to said intermediate plate element.

References Cited

UNITED STATES PATENTS

| | | | |
|---|---|---|---|
| 2,219,497 | 10/1940 | Stevens et al. | 324—61 |
| 2,285,152 | 6/1942 | Firestone | 324—61 |
| 2,373,846 | 4/1945 | Olken | 324—61 |
| 2,428,700 | 10/1947 | Eilenberger | 324—61 |
| 2,718,620 | 9/1955 | Howe | 324—61 |
| 2,880,390 | 3/1959 | Calvert | 324—61 |
| 3,046,479 | 7/1962 | Mead et al. | 324—61 |
| 3,278,843 | 10/1966 | Deming | 324—61 |
| 3,376,503 | 4/1968 | Lundstrom | 324—61 |
| 3,377,553 | 4/1968 | Lillard et al. | 324—61 |

OTHER REFERENCES

German printed application No. 411,698, Dec. 22, 1955, Deyerling.

EDWARD E. KUBASIEWICZ, Primary Examiner

U.S. Cl. X.R.

317—246